United States Patent
Beall et al.

(10) Patent No.: US 12,005,605 B2
(45) Date of Patent: Jun. 11, 2024

(54) METHOD OF MODIFYING A HONEYCOMB-STRUCTURE-FORMING EXTRUSION DIE AND MODIFIED EXTRUSION DIES

(71) Applicant: Corning Incorporated, Corning, NY (US)

(72) Inventors: Douglas Munroe Beall, Painted Post, NY (US); Kenneth Richard Miller, Addison, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 1156 days.

(21) Appl. No.: 16/790,109

(22) Filed: Feb. 13, 2020

(65) Prior Publication Data
US 2020/0298441 A1    Sep. 24, 2020

Related U.S. Application Data

(60) Provisional application No. 62/819,879, filed on Mar. 18, 2019.

(51) Int. Cl.
| | |
|---|---|
| B28B 3/00 | (2006.01) |
| B23P 15/24 | (2006.01) |
| B28B 3/26 | (2006.01) |
| B28B 7/00 | (2006.01) |
| B28B 7/34 | (2006.01) |
| C23F 1/00 | (2006.01) |
| C25D 3/12 | (2006.01) |
| B28B 3/20 | (2006.01) |

(52) U.S. Cl.
CPC ............ *B28B 3/269* (2013.01); *B23P 15/243* (2013.01); *B28B 3/2672* (2013.01); *B28B 7/346* (2013.01); *C23F 1/00* (2013.01); *C25D 3/12* (2013.01); *B28B 2003/203* (2013.01)

(58) Field of Classification Search
CPC ...................................................... B28B 7/346
See application file for complete search history.

(56) References Cited

U.S. PATENT DOCUMENTS

| | | | |
|---|---|---|---|
| 3,983,283 A | | 9/1976 | Bagley |
| 4,021,134 A | * | 5/1977 | Turner ................... B23B 51/04 |
| | | | 407/30 |

(Continued)

OTHER PUBLICATIONS

BalSeal. "Effects of Electroless Nickel Plating." www.balseal.com, 2016, www.balseal.com/wp-content/uploads/2019/03/effects_of_electroless_nickel_plating_on_reciprocating_and_rotary_bal_sealTR_16.pdf. (Year: 2016).*

*Primary Examiner* — Arrie L Reuther
*Assistant Examiner* — Andrés E. Behrens, Jr.
(74) *Attorney, Agent, or Firm* — Russell S. Magaziner

(57) ABSTRACT

Methods of manufacturing honeycomb-structure-forming extrusion dies having a number of slots for use in producing extruded articles having complex honeycomb patterns and extrusion dies for use in the manufacture of extruded honeycomb bodies. The method includes inserting a die insert having a runner and a number of teeth into a slot of an extrusion die such that each of the teeth blocks at least a portion of the slot of the extrusion die. The method further includes separating the runner from the teeth so that the teeth remain within the slot of the extrusion die.

22 Claims, 15 Drawing Sheets

(56) References Cited

U.S. PATENT DOCUMENTS

| | | | |
|---|---|---|---|
| 4,139,144 A | | 2/1979 | Cunningham |
| 4,330,254 A | | 5/1982 | Cunningham |
| 4,984,487 A | * | 1/1991 | Beckmeyer ........... B23P 15/243 |
| | | | 29/896.6 |
| 5,702,659 A | * | 12/1997 | Kragle .................... B28B 3/269 |
| | | | 29/418 |
| 6,343,923 B1 | * | 2/2002 | Cunningham .......... B29C 48/11 |
| | | | 425/467 |
| 6,723,448 B2 | | 4/2004 | Asai et al. |
| 2010/0244309 A1 | * | 9/2010 | Hayashi .................. B28B 3/269 |
| | | | 425/464 |
| 2011/0233171 A1 | * | 9/2011 | Hayashi .................. B23H 1/04 |
| | | | 219/69.15 |
| 2017/0259460 A1 | | 9/2017 | Hirakawa et al. |
| 2022/0105658 A1 | * | 4/2022 | Antesberger ............ C23C 24/06 |

\* cited by examiner

METHOD OF MODIFYING A HONEYCOMB-STRUCTURE-FORMING EXTRUSION DIE AND MODIFIED EXTRUSION DIES

This application claims the benefit of priority under 35 U.S.C. § 119 of U.S. Provisional Application No. 62/819,879 filed on Mar. 18, 2019, the content of which is incorporated herein by reference in its entirety.

FIELD

Embodiments described herein generally relate to methods for modifying an extrusion die. Specifically, embodiments described herein relate to methods for modifying a honeycomb extrusion die in order to produce extruded articles having complex geometries.

BACKGROUND

Honeycomb extrusion dies are used to produce extruded honeycomb structures, such as to produce a honeycomb substrate for catalysts in catalytic converters. Known honeycomb extrusion dies can be formed by wire electrical discharge machining (EDM). In wire EDM, a current is passed through an electrically conductive wire which is used to cut slots in a face of an extrusion die bar stock. Wire EDM can be used to form linear slots. However, wire EDM cannot be used to form a extrusion patterns of more complex configurations, such as patterns with discontinuous slots. While more complex patterns may be prepared using plunge EDM in which an electrode is used to form the slots in the extrusion die to provide the extrusion die with the desired pattern, plunge EDM can be a relatively time-consuming and expensive method for producing an extrusion die.

Accordingly, there is a need in the art for a method for manufacturing an extrusion die to enable the extrusion die to produce extruded articles with more complex honeycomb patterns.

BRIEF SUMMARY OF THE INVENTION

In a first aspect, a method of manufacturing a honeycomb-structure-forming extrusion die having a plurality of slots includes inserting a die insert that includes a runner and a plurality of teeth into a slot of the plurality of slots of the extrusion die such that each of the plurality of teeth blocks at least a portion of the slot, and separating the runner from the plurality of teeth such that the plurality of teeth remain within the slot of the plurality of slots of the extrusion die.

In a second aspect according to the preceding paragraph, the plurality of teeth of the die insert are spaced from one another along a longitudinal axis of the runner.

In a third aspect according to either of the preceding paragraphs, the method further comprises forming the die insert that includes the runner and the plurality of teeth such that the plurality of teeth are arranged on the runner in a blocking configuration for blocking a plurality of portions of the slot.

In a fourth aspect according to the previous paragraph, forming the die insert comprises machining a stainless steel sheet.

In a fifth aspect according to the third paragraph, forming the die insert comprises photochemical machining of a metal sheet.

In a sixth aspect according to any of the three preceding paragraphs, forming the die insert comprises include coating the plurality of teeth of the die insert.

In a seventh aspect according to the preceding paragraph, the coating comprises plating.

In an eighth aspect according to the preceding paragraph, the plating comprises nickel plating.

In a ninth aspect according to any of the three preceding paragraphs, prior to coating, a thickness of each tooth is less than a width of the slot, and after coating the thickness of each tooth is at least as thick as the width of the slot.

In a tenth aspect according to any of the seven preceding paragraphs, forming the die insert comprises forming each of the plurality of teeth with a thickness corresponding to a width of a slot of the plurality of slots of the extrusion die.

In an eleventh aspect according to any of the eight preceding paragraphs, each of the plurality of teeth comprises a first end connected to the runner and a second end, and wherein forming the die insert includes preparing each of the plurality of teeth such that a thickness of the first end of each of the plurality of teeth is greater than a thickness of the second end of each of the plurality of teeth.

In a twelfth aspect according to any of the preceding paragraphs, the method further comprises inserting a shim into a slot of the plurality of slots prior to inserting the die insert into a slot of the plurality of slots of the extrusion die.

In a thirteenth aspect according to the preceding paragraph, the method comprises inserting the shim into a slot of the plurality of slots of the extrusion die in an orientation perpendicular to the die insert.

In a fourteenth aspect according to either of the two preceding paragraphs, the method comprises removing the shim and subsequently securing the plurality of teeth to the extrusion die.

In a fifteenth aspect according to any of the preceding paragraphs, separating the runner from the plurality of teeth comprises separating the runner by wire electric discharge machining or plunge electric discharge machining.

In a sixteenth aspect according to any of the preceding paragraphs, the method further comprises securing the plurality of the teeth to the extrusion die by plating the plurality of teeth and the extrusion die.

In a seventeenth aspect according to the preceding paragraph, plating is performed using nickel or a nickel alloy.

In an eighteenth aspect according to any of the preceding paragraphs, the method further comprises preparing a plurality of die inserts and inserting the plurality of teeth of each of the plurality of die inserts into the plurality of slots of the extrusion die.

In a nineteenth aspect, some embodiments relate to an extrusion die formed by a method according to any of the preceding paragraphs.

In a twentieth aspect, a method of modifying a honeycomb-structure-forming extrusion die having a plurality of slots includes inserting a first die insert into a first slot of the plurality of slots of the extrusion die such that each of a first plurality of teeth of the first die insert blocks a portion of the first slot, the plurality of teeth extending from a first runner of the first die insert, separating the first runner from the first plurality of teeth of the first die insert, inserting a second die insert into a second slot extending perpendicularly to the first slot such that each of a second plurality of teeth of the second die insert blocks a portion of the second slot, and such that the second plurality of teeth of the second die insert mate with the first plurality of teeth of the first die insert, the second plurality of teeth extending from a second runner of the second die insert, and separating the second runner from the second plurality of teeth of the second die insert.

In a twenty-first aspect according to the previous paragraph, wherein each of the first plurality of teeth of the first die insert has a first end connected to the first runner and a second end opposite the first end, wherein each of the first plurality of teeth comprises a slit extending from the first end towards the second end; and wherein each of the second plurality of teeth of the second die insert has a first end connected to the second runner and a second end, wherein each of the second plurality of teeth comprises a slit extending from the second end towards the first end, such that the first die insert and the second die insert mate by engaging the slits on the plurality of teeth of the first die insert with the slits of the plurality of teeth of the second die insert.

In a twenty-second aspect according to the preceding paragraph, the method comprises inserting the first plurality of teeth of the first die insert into a slot of the plurality of slots such that the slit of each of the first plurality of teeth is arranged at an intersection of two slots.

In a twenty-third aspect, a method of modifying a honeycomb-structure-forming extrusion die having a plurality of slots includes forming a die insert that includes a runner and a plurality of teeth, wherein the plurality of teeth are spaced from one another along a longitudinal axis of the runner, inserting the die insert into a slot of the plurality of slots of the extrusion die so that a material cannot be extruded through the portions of the slot of the extrusion die in which the plurality of teeth are inserted, and separating the runner from the plurality of teeth such that the plurality of teeth remain within the slot of the plurality of slots of the extrusion die.

In a twenty-fourth aspect, an extrusion die includes a plurality of pins defining a plurality of intersecting slots therebetween with at least one slot extending in a first direction across an entire discharge face of the extrusion die and at least one slot extending in a second direction across the entire discharge face of the extrusion die, the second direction being transverse to the first direction; and a plurality of teeth located in a slot of the plurality of intersecting slots extending in the first direction so as to block a flow of material through at least a portion of the slot during extrusion.

In a twenty-fifth aspect according to the preceding paragraph, each of the plurality of teeth comprises a coating.

In a twenty-sixth aspect according to the preceding paragraph, the coating is a nickel plating.

In a twenty-seventh aspect according to any of the three preceding paragraphs, a thickness of each tooth of the plurality of teeth is at least as thick as a width of the slot of the plurality of intersecting slots.

In a twenty-eighth aspect according to any of the four preceding paragraphs, the plurality of teeth are further located in a slot extending in the second direction.

In a twenty-ninth aspect according to any of the five preceding paragraphs, the plurality of pins are arranged in a square grid.

In a thirtieth aspect according to any of the six preceding paragraphs, each of the plurality of teeth have a height that is the same as or greater than a depth of the slot of the plurality of slots.

BRIEF DESCRIPTION OF THE DRAWINGS/FIGURES

DETAILED DESCRIPTION OF THE INVENTION

Figure 1A:
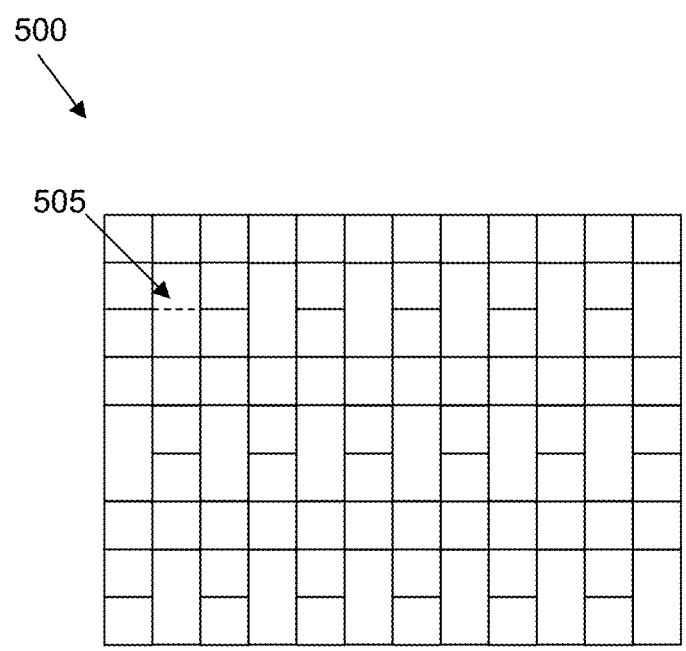
FIGS. 1A-1C show examples of extruded articles having complex honeycomb patterns formed using extrusion dies produced by a method according to an embodiment disclosed herein.

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Honeycomb extrusion dies are used to produce extruded articles having a honeycomb pattern. Such extruded articles may be used in a variety of applications, such as substrates for catalysts in catalytic converters or as particulate filters. The honeycomb structure provides a large surface area on which the catalyst can be placed and/or particulate matter can be captured. However, it may be desirable to form a catalyst substrate or particulate filter with more complex geometry, which may result in improved performance of the honeycomb article, such as reduced pressure drop, increased ash storage capacity, filtration efficiency, and reduced sensitivity to plugging of the substrate, among others. Using known methods for forming extrusion dies, such as wire EDM or abrasive wheel slitting, extrusion dies can only be formed by a series of linear slots extending across an entirety of a discharge face of the die (e.g., from one side of the extrusion die to an opposing side and/or as a chord connected between two points on the circumference of a circular-shaped extrusion die), so as to form a conventional grid pattern. Extrusion dies so formed cannot be used produce extruded articles having more complex patterns, such as patterns including discontinuous sections, or extruded articles having openings of different sizes and shapes.

While other methods exist for forming honeycomb extrusion dies capable of producing complex extruded articles, other methods, such as plunge EDM, may be time consuming and expensive. Plunge EDM utilizes an electrode which is separately prepared. Further, the electrode may deteriorate after multiple uses and may need to be replaced. Wire EDM is used to form honeycomb extrusion dies, although for producing features of honeycomb structures which are relatively simple (e.g., having slots that each extend as a continuous straight line across the face of the die).

Embodiments disclosed herein comprise selectively blocking portions of otherwise straight and continuous slots of an extrusion die in order to create more complex honeycomb patterns for the article extruded by the extrusion die. The term "block" or "blocking" as used herein means stopping, hindering, preventing, reducing, or otherwise impeding. Examples of more complex honeycomb patterns that can result from the embodiments disclosed herein can be appreciated from FIGS. 1A-1C. More particularly, the patterns of FIGS. 1A-1C resemble a square grid of alternating walls (corresponding to the slots of the extrusion die used to make the honeycomb structure) and channels (corresponding to the pins of the extrusion die used to make the honeycomb structure), but with a plurality of discontinuous sections 505 (some of which shown in dashed lines) at which the walls are discontinuously broken. In other words, absent the discontinuous sections 505, the patterns of FIGS. 1A-1C would resemble a continuous grid of equally sized squares. It is to be appreciated that an extrusion die including only continuous straight slots can be utilized to create other honeycomb patterns, such as triangle- or parallelogram-shaped channels.

Figure 2:
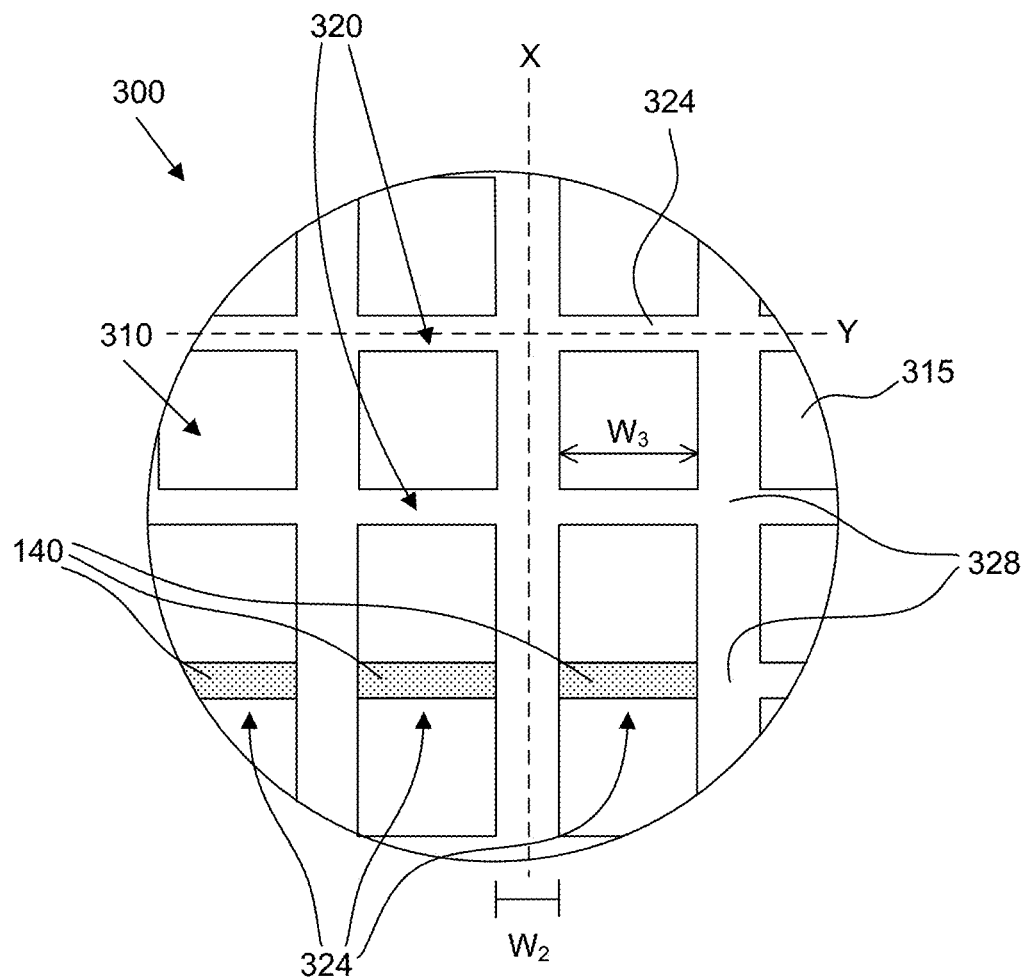
FIG. 2 shows a close-up view of a portion of an unmodified extrusion die according to an embodiment.

A portion of an extrusion die 300 is shown in FIG. 2, having a discharge face 310 comprising pins 315 defining a plurality of intersecting slots 320 therebetween. The slots 320 have a width $w_2$, which can be consistent for every slot 320 in the die 300 or variable for different ones of the slots 320 or for different portions of the same slot. Each of the pins 315 has a width $w_3$, which can also be consistent for every one of the pins 315 in the die 300 or variable for different ones of the pins 315, or for different directions of the pins 315.

Some embodiments herein relate to a method for manufacturing a honeycomb extrusion die by inserting a die insert 100 (as shown for example in FIG. 3) having a runner 120 and a plurality of teeth 140 into one or more of the slots 320 of the extrusion die 300 so as to block a plurality of portions 324 of slot 320 to prevent material from extruding through the blocked portion of slot 320. Once die insert 100 is inserted into slot 320 of extrusion die 300, runner 120 can be separated from plurality of teeth 140 so that the teeth 140 remain in slot 320 when the runner 120 is removed. The teeth 140 can be secured to extrusion die 300, such as by a friction or interference fit, welding, bonding, adhesives, etc. Thus, when the modified extrusion die is used to form an extruded article, extruded material is unable to flow through the portions 324 of the slots 320 that are blocked by teeth 140, resulting in an extruded article having a complex honeycomb pattern with discontinuous walls, e.g., having the discontinuous sections 505. In this way, even if the slots 320 are initially formed as continuous straight slots, the blocking effect of the teeth 140 effectively causes the slots 320 to extrude material in a pattern having discontinuous sections, i.e., as if the slots 320 did not extend fully across the discharge face from one side of the discharge face to an opposing side.

Figure 1B:
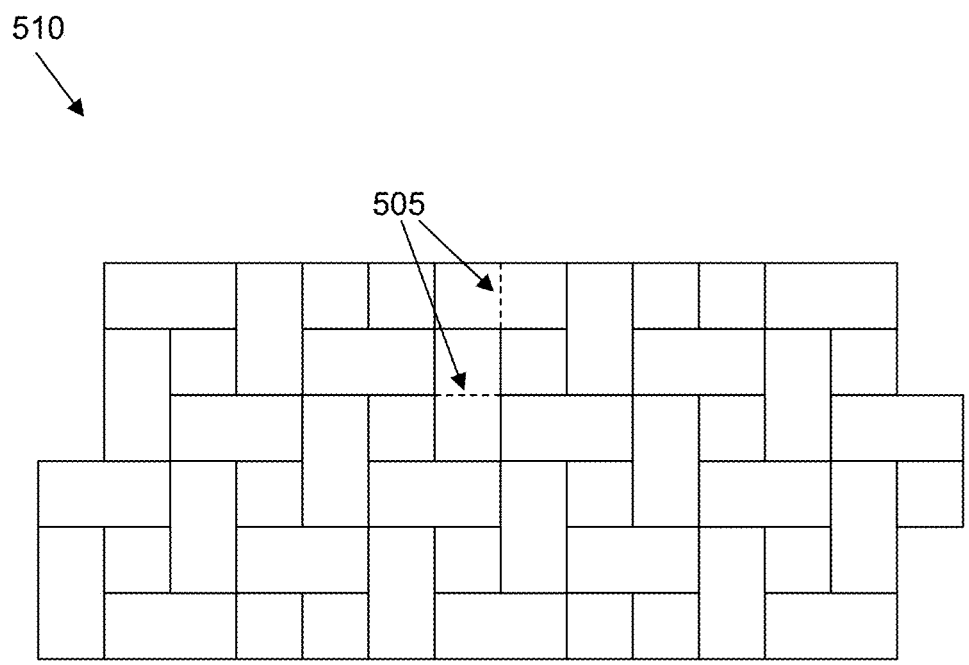
Figure 1C:
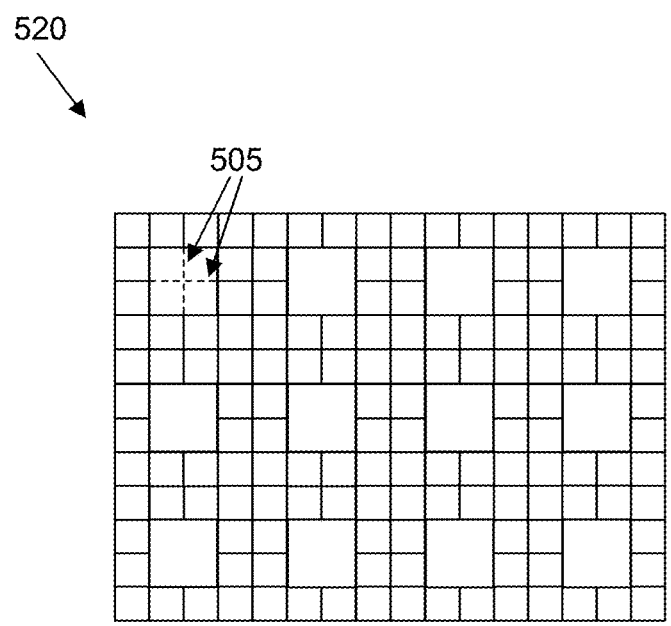

Some embodiments herein include a die insert 100 configured to block portions 324 of slots 320 of extrusion die 300. By blocking a portion 324 of a slot 320 of an extrusion die 300, an extruded article can be formed that corresponds to the shape of the portions of the slots 320 that are not blocked. That is, each of the portions 324 that is blocked by one of the teeth 140 will create a corresponding discontinuous section 505 in the extruded honeycomb pattern. Thus, extrusion die 300 can be arranged to produce extruded articles with more complex patterns, such as shown for example at FIGS. 1A-1C as extruded articles 500, 510, and 520. As shown in FIGS. 1A-1C, the extruded articles 500, 510, 520 can be formed to have complex patterns other than a square grid pattern, and can have regions with larger openings or different shaped openings.

Figure 3:
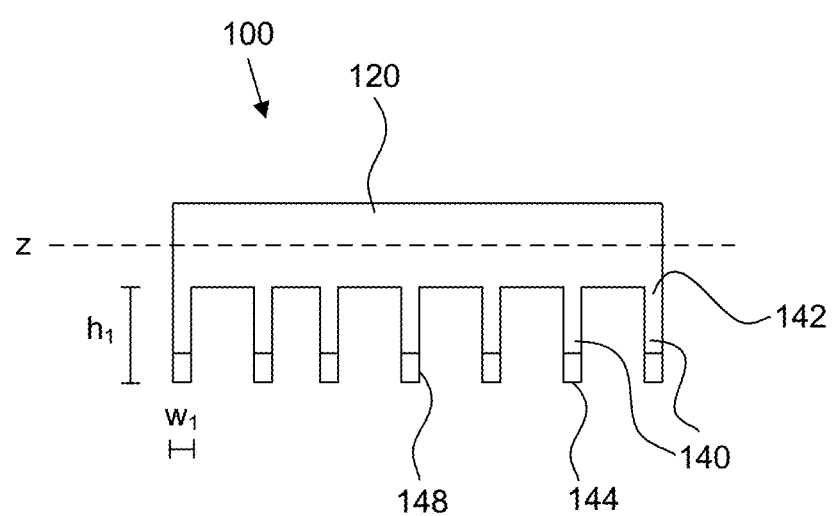
FIG. 3 shows a plan view of a die insert according to some embodiments.

A plurality of feedholes are in communication with the plurality of slots 320 so as to supply extrudable material (e.g., a ceramic-forming mixture) to the slots 320, which is extruded by the slots 320 at the discharge face 310. As shown in FIG. 3, the plurality of slots 320 can include a plurality of spaced and parallel slots 320 extending in a first direction along or parallel to axis X, and a plurality of spaced and parallel slots 320 extending in a second direction along or parallel to axis Y. When the first direction is perpendicular to the second direction, the discharge face 310 resembles a grid of squares. However, other patterns formed by crisscrossing straight continuous slots are possible, such as with respect to triangular- or parallelogram-shaped pins. In some embodiments, the first direction is arranged at an angle other than perpendicular to the second direction so as to form a grid of parallelogram or diamond shapes, while slots arranged at various angles with respect to three different directions can be arranged to form a grid of triangles. Extrusion die 300 is configured to produce an extruded article by flowing an extrudable material through the slots 320, so as to produce an article with a pattern of slots 320.

As used herein, an "intersection" 328 of slots 320 of extrusion die 300 is defined as a location where two slots 320 of extrusion die 300 intersect. As used herein, a "portion" 324 of a slot 320 includes any length of a slot 320 that is less than the entire length of slot 320. In some embodiments, the portion 324 comprises a length of a slot 320 between two adjacent intersections 328. However, portion 324 can be a smaller or greater length in order to block the desired amount or length of slot 320.

According to some embodiments, one or more die inserts 100 are inserted into a slot 320 of an extrusion die 300 so as to block a plurality of portions 324 of slot 320. Each of the plurality of teeth 140 includes a first end 142 connected to runner 120 and a second end 144 to be inserted into a slot 320. Teeth 140 are configured to be inserted into a slot 320 of extrusion die 300 so as to block a portion 324 of slot 320 to prevent extruded material from flowing through that portion 324 of slot 320. Teeth 140 are arranged on runner 120 in a configuration that corresponds to the arrangement of pins 315 and slots 320 for blocking a plurality of portions 324 of a slot 320 of extrusion die 300. In this way, the extrusion die 300 can be used to produce an extruded article with a desired pattern comprising discontinuities (e.g., the discontinuous sections 505) corresponding to each of the portions 324 that are blocked by the teeth 140. Teeth 140 are spaced from one another along a longitudinal axis Z of runner 120. Teeth 140 can be arranged along runner 120 in a blocking configuration for blocking one or more portions of a slot 320. In some embodiments, teeth 140 are arranged along runner 120 at a fixed interval. Thus, die insert 100 allows for a plurality of portions 324 of a slot 320 to be blocked at the same time by simultaneously inserting the plurality of teeth 140 into a slot 320 with a single one of the runners 120, as opposed to individually placing a tooth in each portion of a slot to be blocked.

Each of the plurality of teeth 140 can have the same shape and dimensions, or different shapes and dimensions. Teeth 140 can have a height, $h_1$, that is the same as or greater than a depth of a slot 320 of extrusion die 300 such that teeth 140 fill the depth of slot 320 and runner 120 is positioned above discharge face 310 of extrusion die 300 when teeth 140 are inserted into slot 320. Each of the plurality of teeth 140 has a width $w_1$ measured in a direction parallel to longitudinal axis Z of die insert 100. The width $w_1$ can be selected so as to block a desired portion 324 of a slot 320 of extrusion die 300. For example, the width $w_1$ of the tooth 140 can be approximately the same as a width $w_3$ of the pins 315 so that the tooth spans between two adjacent intersections 328 of a slot 320. In other embodiments, the width $w_1$ of the teeth 140 differs from width $w_3$ of pins 315. In one embodiment, the width $w_1$ is greater than the width $w_3$ such that each tooth 140 extends in a slot 320 across multiple of the pins 315.

Figure 4:
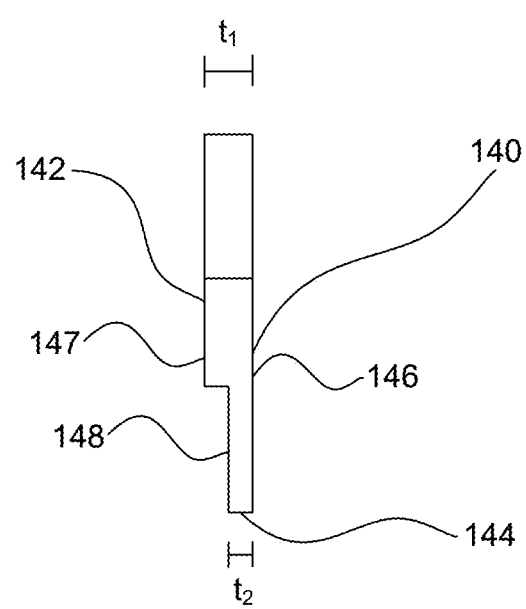
FIG. 4 shows a side view of the die insert of FIG. 3.

Each tooth 140 has a thickness, $t_1$, as best shown in FIG. 4, that is measured in a direction from a first surface 146 of tooth 140 to the opposing surface 147. In some embodiments, the thickness $t_1$ of each tooth 140 is the approximately the same as, or slightly thicker than the width $w_2$ of a slot 320 such that the thickness $t_1$ corresponds to the width $w_2$ of slot 320. In this way, each tooth 140 fills the entire width $w_2$ of the portion 324 of slot 320 so as to block extruded material from flowing through that portion 324 of slot 320 during extrusion. In some embodiments, a second end 144 of each of the plurality of teeth 140 has a thickness t2 that is less than the thickness $t_1$ of the remainder of the tooth 140 so as to facilitate insertion of each tooth 140 into a slot 320 of extrusion die 300. In some embodiments, thickness t2 of second end 144 of each tooth 140 is about 40 to 60% less than the thickness $t_1$ of the remainder of tooth 140. The teeth 140 can be tapered toward second end 144 and/or have a region 148 of reduced thickness.

Figure 5:
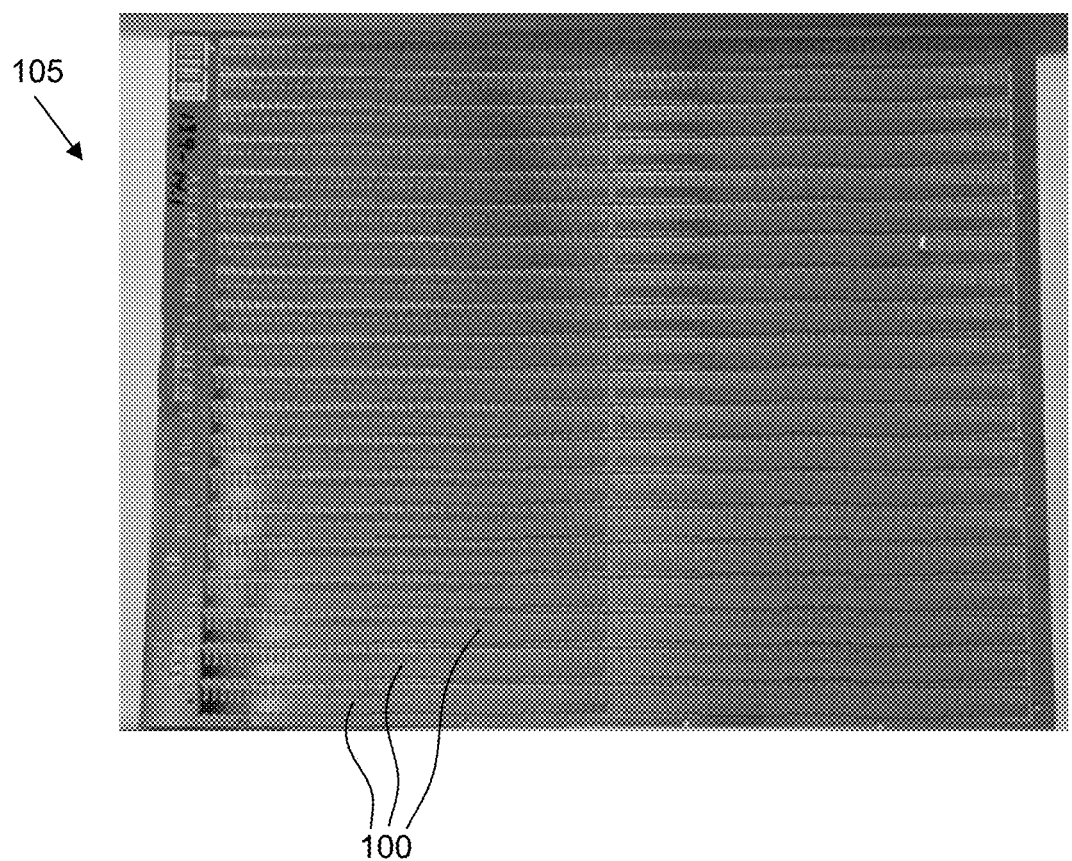
FIG. 5 shows a plurality of die inserts formed from a metal sheet by a machining process according to an embodiment.

Die insert 100 can be formed by machining a sheet of metal, such as stainless steel, to form runner 120 and teeth 140 in the desired arrangement on runner 120. As shown in FIG. 5, a plurality of die inserts 100 are formed simultaneously from a sheet 105 of metal. Die insert 100 can be formed by any of various methods including, for example, photochemical machining of a metal sheet, wire EDM, or water jet machining, among other methods.

In some embodiments, forming die insert 100 additionally includes coating, covering, or plating die insert 100. Die insert 100 can be coated, e.g., plated, with any suitable material, such as nickel or a nickel alloy. Coating processes such as electroplating or other plating techniques can be used to adjust the thickness of die insert 100 so that the thickness of the coated die insert 100 is the same as or slightly greater than width $w_2$ of slots 320 to ensure that when die insert 100 is inserted to slot 320, die insert 100 fits tightly within slot 320. In some embodiments, coating, e.g., plating, results in the thickness $t_1$ of each tooth 140 being the same as $w_2$ or as much as 0.0003 inches larger than $w_2$. In some embodiments, the thickness $t_1$ is about 0.001 to 0.002 inches thinner than the width $w_2$ of the slots 320 before the teeth are plated. In addition to setting the final dimensions (e.g., thickness $t_1$) of the teeth 140 to assist in frictionally securing teeth 140 to die 300, the coating, e.g., plating, can be selected to provide an abrasion-resistant layer.

Figure 6:
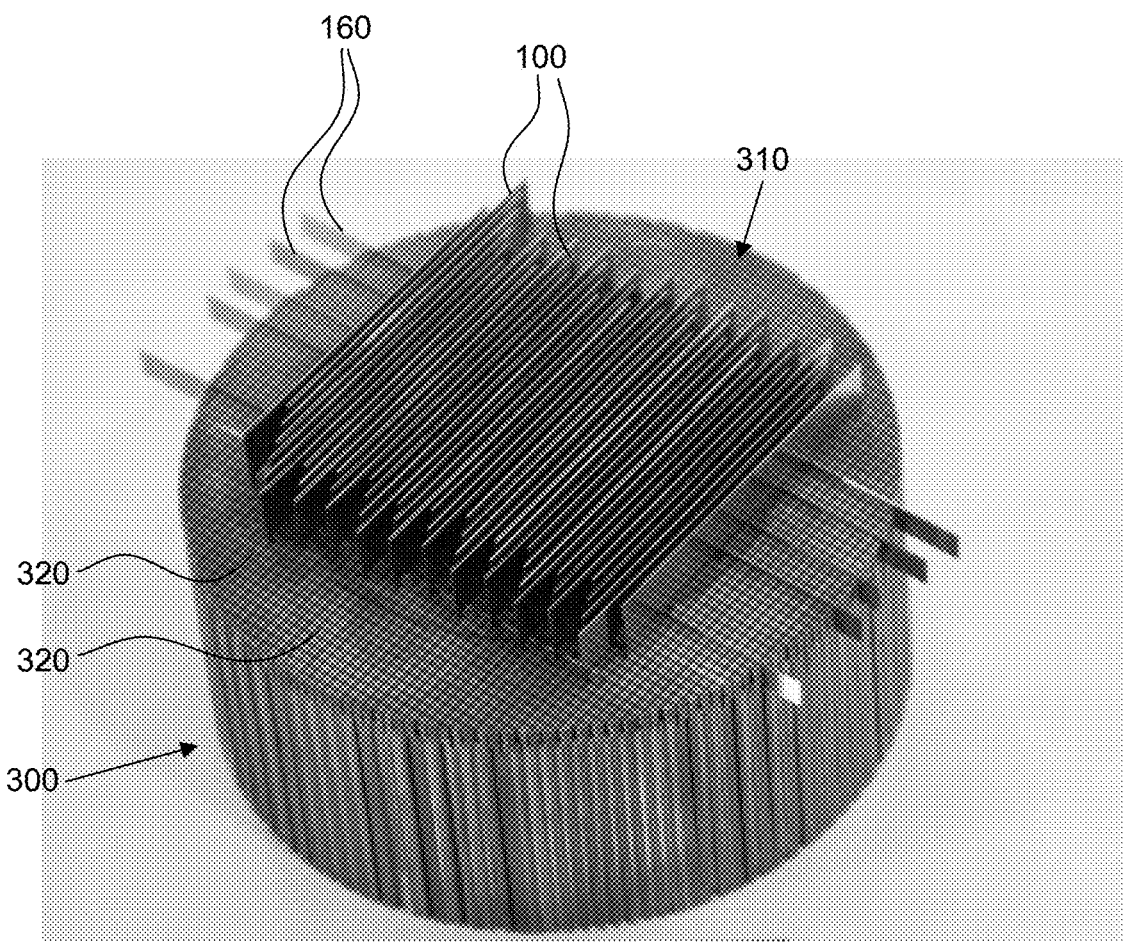
FIG. 6 shows a perspective view of an extrusion die having a plurality of die inserts and shims inserted therein according to an embodiment.

Die inserts 100 can be inserted into slots 320 on the face 310 of extrusion die 300 as shown in FIG. 6. In some embodiments, one or more shims 160 can be inserted into the slots 320 of extrusion die 300 to facilitate alignment of die inserts 100 within slots 320, so that teeth 140 of die insert 100 block a desired portion of slot 320. Shim 160 can be formed as a rectangular plate or strip and is configured to be inserted into a slot 320 along the length of the slot 320. Shims 160 can be manually placed in the desired slots 320 for aligning die inserts 100. Shims 160 can be loosely positioned within slots 320 or frictionally fit so that shims 160 can be removed once die inserts 100 are properly aligned within slots 320. With die insert 100 inserted into a slot 320 extending in a first direction, shim 160 can be inserted into a slot 320 extending in a second direction so as to restrict the movement of die insert 100 and to help align the die insert 100. For example, shim 160 can be inserted in a slot 320 that is transverse to slot 320 in which die insert 100 is positioned, e.g., perpendicular when slots 320 are arranged as squares. Shim 160 can be positioned in a space between teeth 140 of a die insert 100 such that shim 160 abuts a tooth 140 to prevent movement of a tooth 140 along slot 320. In this way, after inserting the teeth 140 into the slot 320, the insert 100 can be shifted within (e.g., slide along) the slot 320 until one or more of the teeth 140 encounter the shim 160, thereby accurately setting the position for the teeth 140 of the die insert 100.

Figure 7:
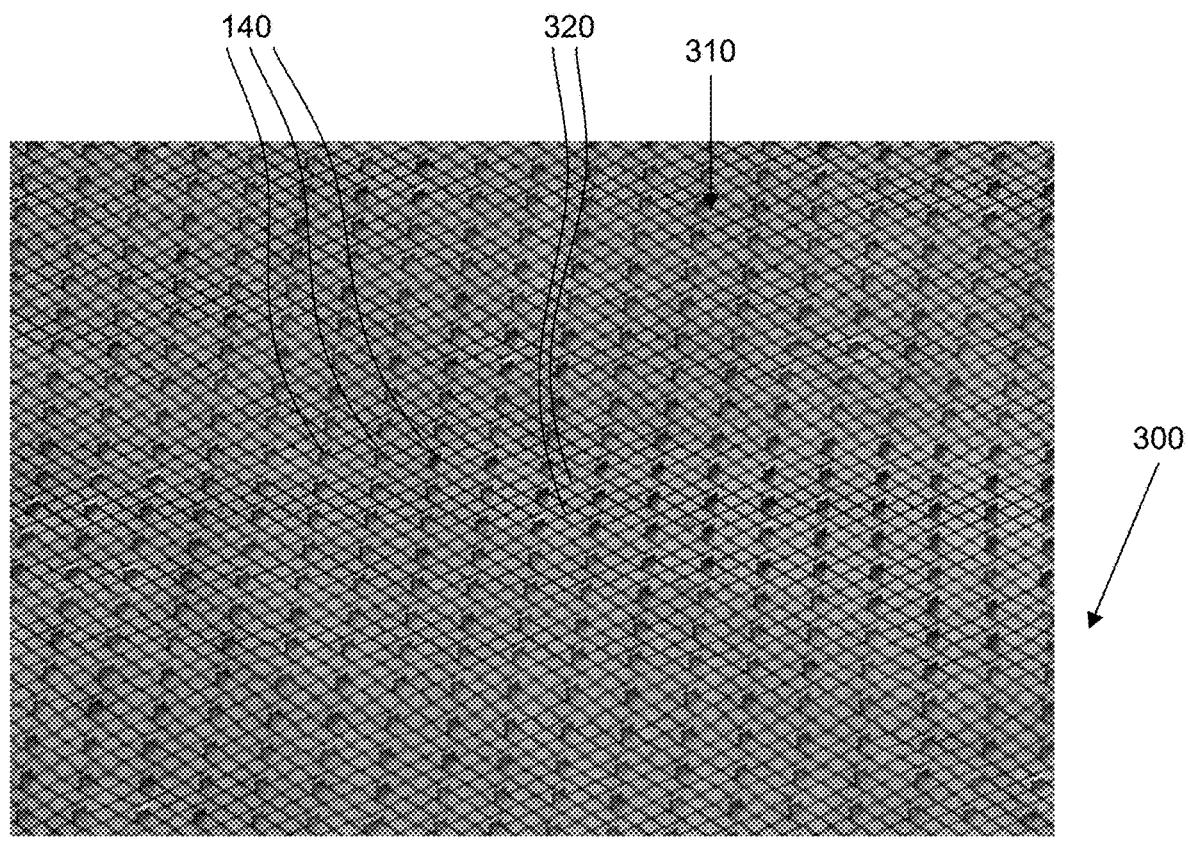
FIG. 7 shows a perspective view of a modified extrusion die according to an embodiment.

Once die insert 100 is inserted into slot 320 and properly positioned and aligned, such as by use of shims 160, runner 120 is separated from teeth 140 such that plurality of teeth 140 remain within slot 320, as shown in FIG. 7. Shims 160 can be left in place within extrusion die 300 so as to prevent movement of teeth 140 during removal of runner 120. Runner 120 can be separated from teeth 140 by any of various processes, including for example by a cutting tool, wire EDM, plunge EDM, etc. In some embodiments, the runner 120 includes a weakened section such as perforations, a groove, etc. to assist in separation from the teeth 140. Runner 120 is removed so that runner 120 does not block or interfere with extruded material flowing through slots 320 when extrusion die 300 is in use to produce extruded articles. Once runner 120 is removed, shims 160 can then be removed from slots 320 if the shims 160 have not been removed previously. Shims 160 can be preferably removed by carefully withdrawing the shims 160 from the slots without moving teeth 140.

As discussed above, teeth 140 can be dimensioned so that the teeth 140 fit closely within slots 320 and are frictionally secured therein. In some embodiments, however, teeth 140 are further secured to extrusion die 300 to prevent movement of teeth 140 when extrusion die 300 is used to produce extruded articles, during cleaning of the extrusion die 300 using high pressure water jets, etc. In some embodiments, the teeth 140 are secured in place using welding, bonding, or adhesives. In some embodiments, securing teeth 140 to slots 320 of extrusion die 300 comprises plating plurality of teeth 140 and extrusion die 300. The securing can be performed before the shims 160 are removed and/or before the runner 120 is separated from the teeth.

Figure 8:
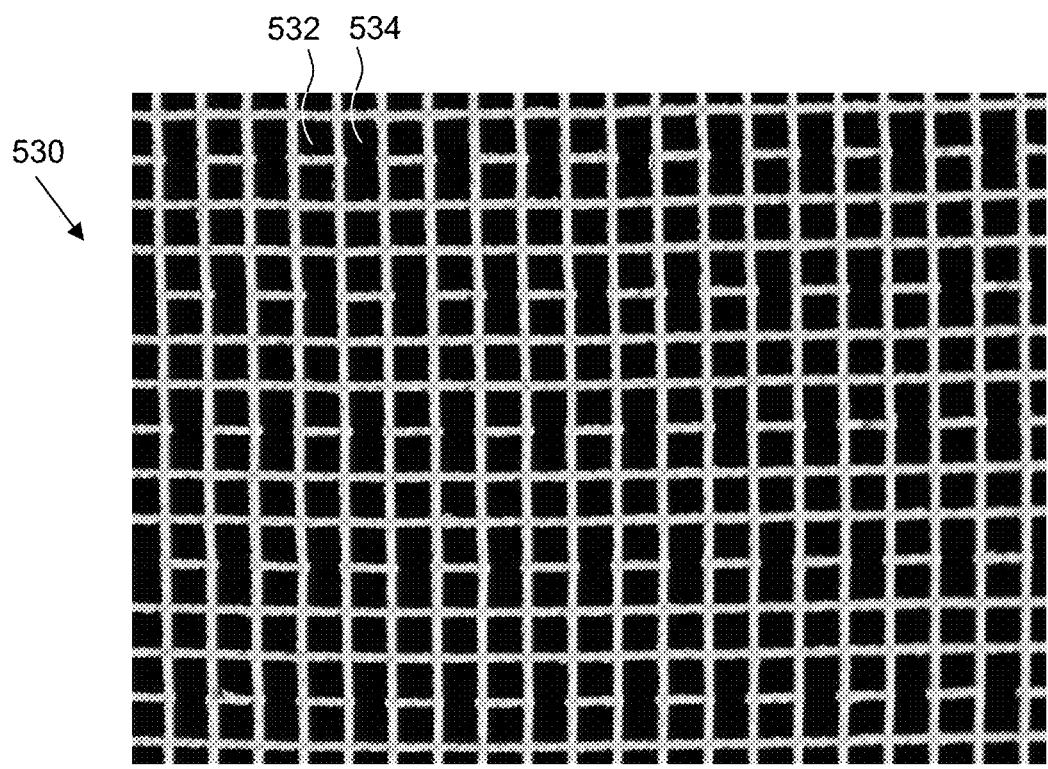
FIG. 8 shows an isometric view of a portion of an extruded article forming using a modified extrusion die according to an embodiment.

After removal of the runner 120, extrusion die 300 can be used to produce extruded articles 530 with more complex geometry, namely, by selectively blocking flow through the extrusion die with teeth 140. FIG. 8 shows a portion of an extruded article produced by an extrusion die having a continuous grid of square pins modified in accordance with the above so as to comprise square openings 532 (i.e., formed by a single square pin) and larger rectangular openings 534. The larger rectangular openings 534 are formed as the result of a tooth of the die insert blocking a portion of a slot (i.e., the portion of the slot located between an adjacent pair of square pins) such that no material is extruded through that portion of the slot, resulting in a discontinuous or empty portion (e.g., the discontinuous sections 505 discussed above). Alternatively stated, a portion of the grid pattern defining the extruded article 530 that would otherwise be filled by a wall is empty due to the use of a tooth of the die insert to block extrusion of material through that portion of the slot.

In some embodiments, it is desirable to block one or more intersections 328 of slots 320 in extrusion die 300. To block an intersection 328, a first die insert 200 can be positioned in a slot 320 extending in a first direction (e.g., with respect to the axis X), and a second die insert 250 can be positioned in a slot 320 extending in a second direction (e.g., with respect to the axis Y). As discussed in more detail below, the first plurality of teeth 240 of first die insert 200 are configured to mate with second plurality of teeth 290 of second die insert 250 so that teeth 240, 290 of first and second die inserts 200, 250 form a plus-sign or X-shape to block an intersection 328 of extrusion die 300.

Figure 9:
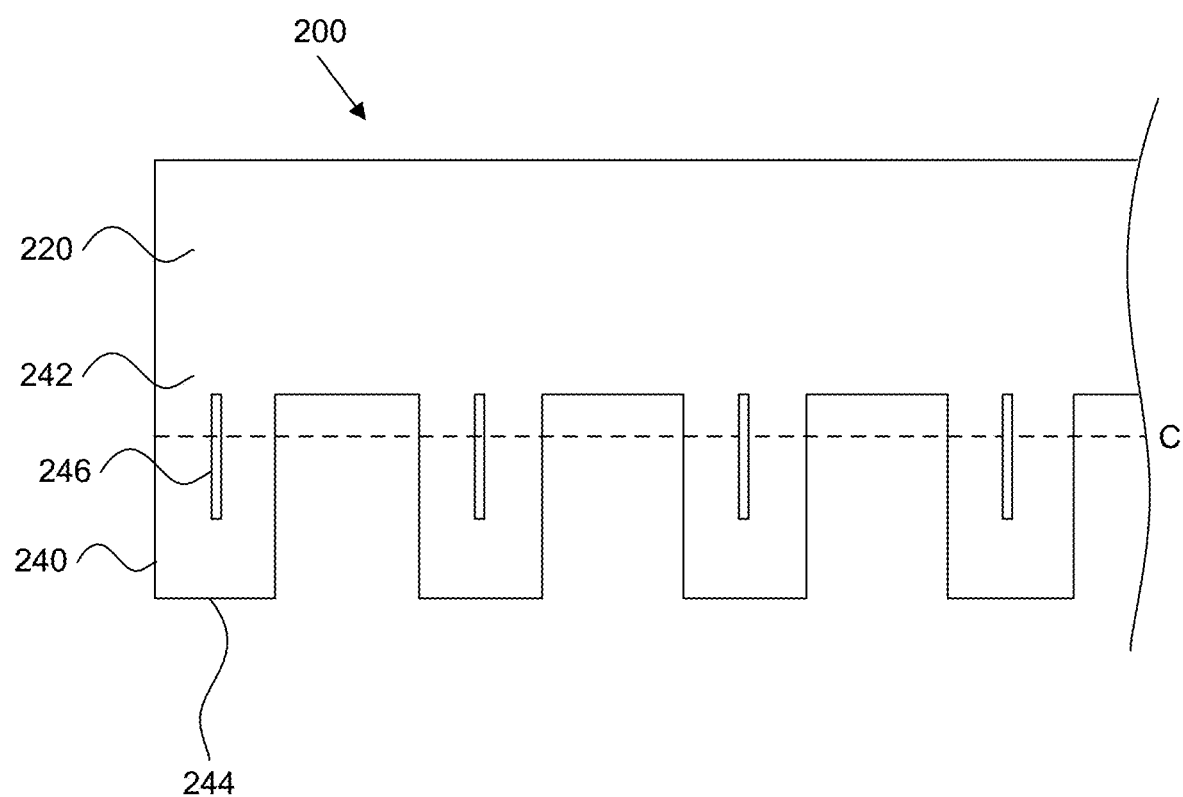
FIG. 9 shows a plan view of a portion of a die insert according to an embodiment.

The first die insert 200, as shown in FIG. 9, is formed in substantially the same manner as the die insert 100 of FIG. 3, and can have the same general shape and configuration. Thus, first die insert 200 comprises a first runner 220 with the first plurality of teeth 240 extending from the first runner 220. However, first die insert 200 differs from die insert 100 of FIG. 3, in that first die insert 200 further comprises a slit 246 on each tooth 240. Slit 246 extends from first end 242 toward second end 244 of each tooth 240. Slit 246 is shown as having a generally rectangular configuration, but may be formed with other shapes. Further, slit 246 can be centrally positioned on each tooth 240 if it is desired to center the teeth 240 in the intersections 328. When first die insert 200 is inserted into a slot 320, first runner 220 can be separated from first plurality of teeth 240 along line C such that the slit 246 is open at the first end 242 of each tooth 240. First die insert 200 can be inserted into extrusion die 300 such that slit 246 of each tooth 240 is positioned at an intersection 328 of two slots 320.

Figure 10:
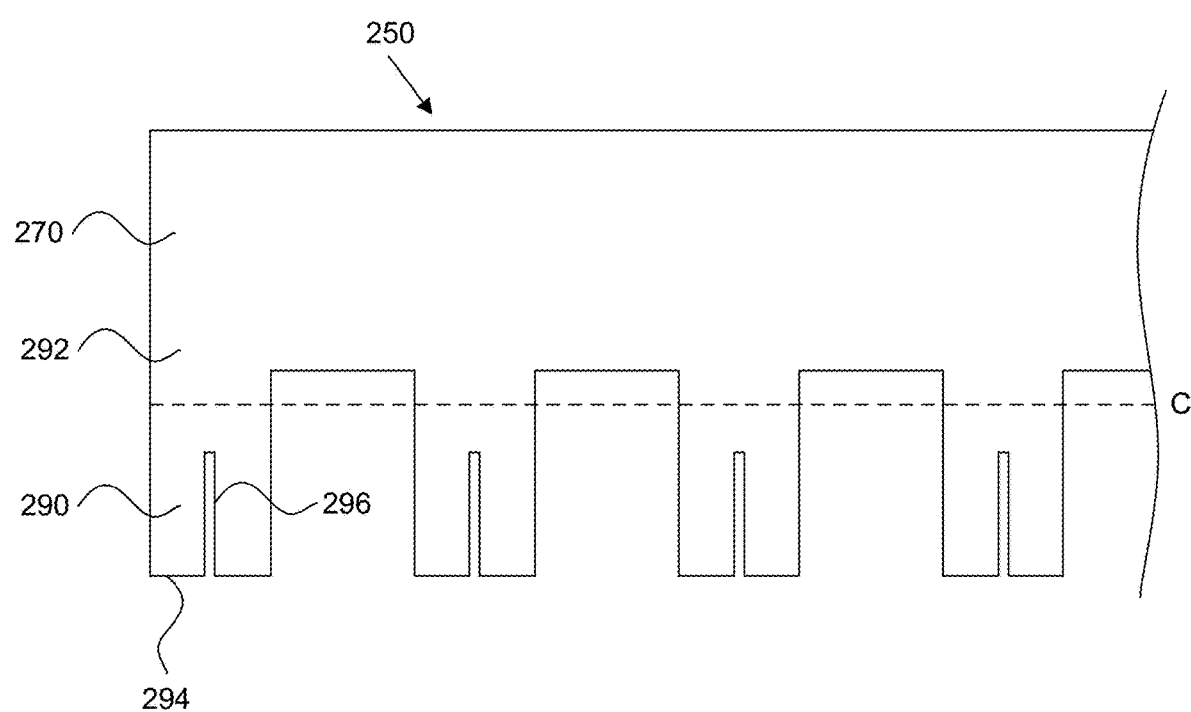
FIG. 10 shows a plan view of a portion of a die insert according to an embodiment.

Second die insert 250 configured to mate with first die insert 200 is shown in FIG. 10. Second die insert 250 is formed substantially the same as first die insert 200 (and also die insert 100 of FIG. 3), and comprises a second runner 270 with the second plurality of teeth 290 extending from second runner 270. Second die insert 250 also comprises a slit 296, however, slit 296 of second die insert 250 extends from second end 294 of each tooth 290 toward first end 292. Thus, slit 296 is open at second end 294 of each tooth 290.

Figure 11:
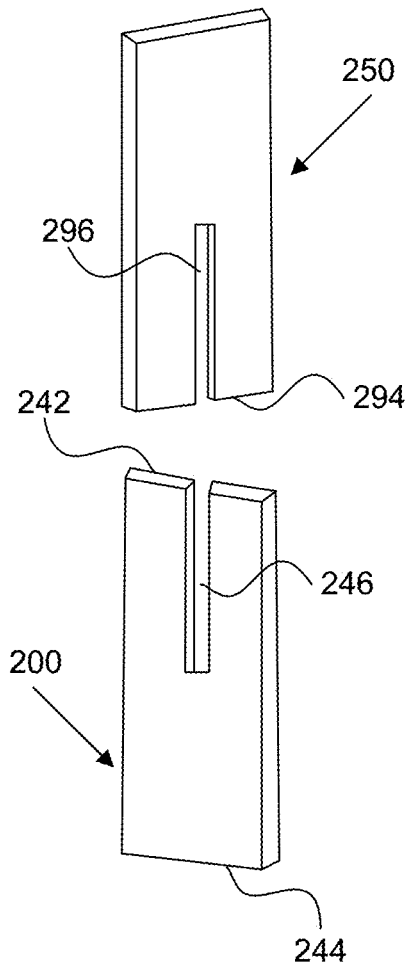
FIG. 11 shows a perspective view of the mating of a first tooth with a second tooth according to an embodiment.

As shown in FIG. 11, the teeth of first and second die inserts 200, 250 are configured to mate with one another. By aligning and engaging slits 246, 296 of teeth 240, 290, the teeth 240, 290 of the first and second die inserts 200, 250 mate to form a plus-sign or X-shape that can fill an intersection 328 of a slot 320 and adjacent slot portions 324. After mating the teeth 240 and 290 together by aligning and engaging the slits 246 and 296, the second runner 270 can be separated from the second plurality of teeth 290 by cutting along line C in FIG. 10.

Figure 12:
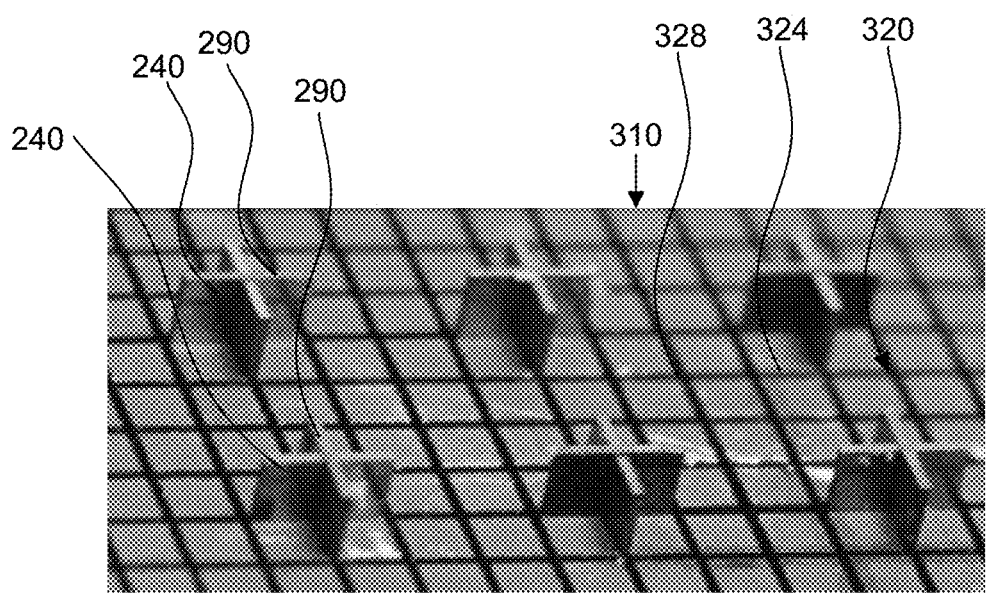
FIG. 12 shows a perspective view of a portion of a modified extrusion die according to an embodiment.

In order to form an extrusion die having blocked intersections as shown in FIG. 12, the teeth 240 of first die insert 200 are inserted into a slot 320 so that each tooth 240 of first die insert 200 is positioned at an intersection 328 of extrusion die 300. First runner 220 is separated from the teeth 240 so that slit 246 is open at first end 242 of tooth 240 as discussed above. Since engagement of the slits 246 with the slits 296 is required to mate the teeth 240 and 290 together, first runner 220 of first die insert 200 must be removed prior to placing second die insert 250. Second die insert 250 is then positioned in a slot 320 extending in a different direction than first die insert 200, e.g., positioned perpendicularly with respect to first die insert 200 for an extrusion die having square pins and perpendicular slots. Slit 296 of each tooth 290 of second die insert 250 is open at second end 294 of tooth 290. Thus, slit 296 of each tooth 290 of second die insert 250 can be engaged with slit 246 of each tooth 240 of first die insert 200. Once second die insert 250 is inserted into slot 320, second runner 270 of second die insert 250 can also be removed (e.g., by cutting along line C shown in FIG. 10).

Figure 13:
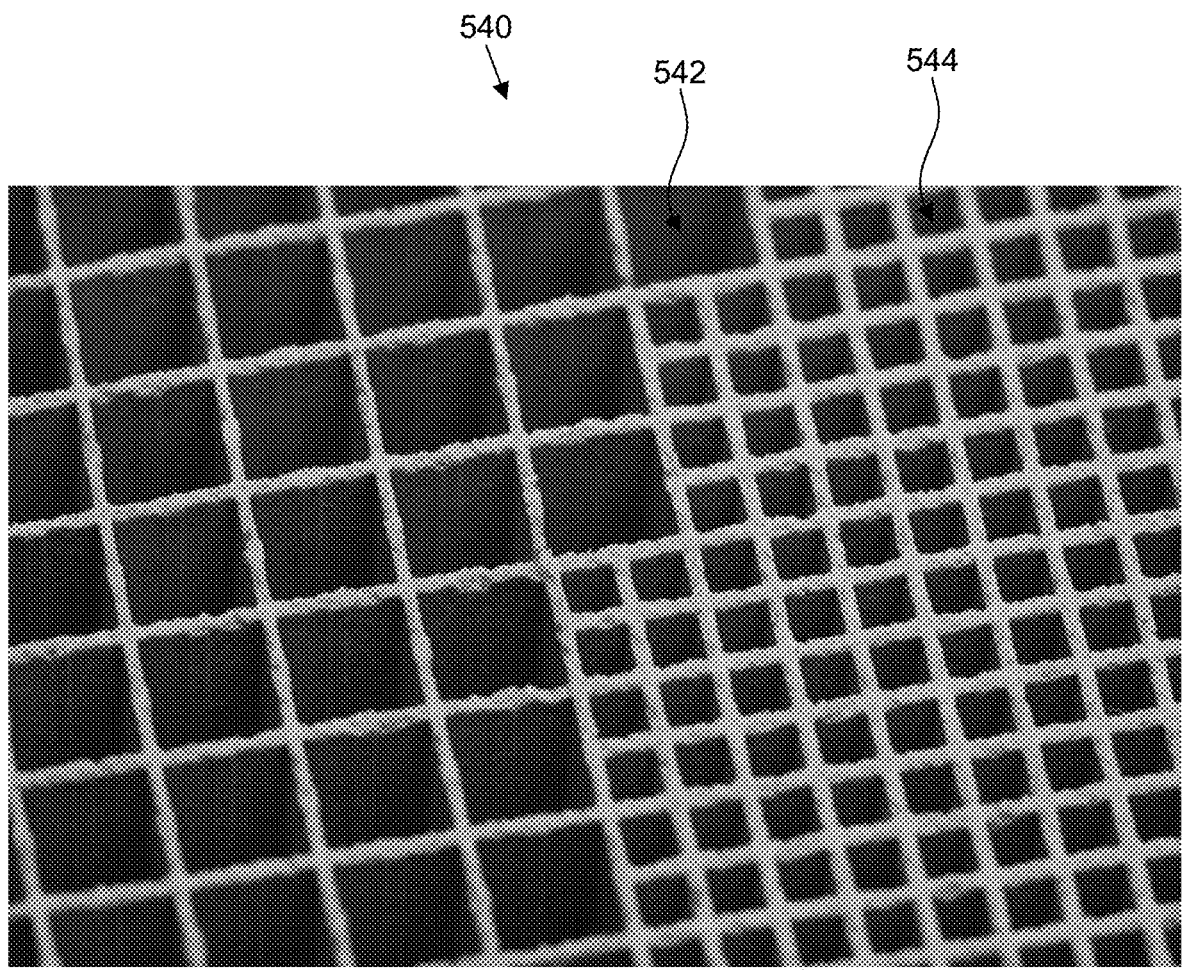
FIG. 13 shows a perspective view of a portion of an extruded article with a complex honeycomb pattern formed using a modified extrusion die according to an embodiment.

An example of an extruded article 540 formed by an extrusion die having blocked intersections is shown in FIG. 13. By blocking one or more intersections of extrusion die, and optionally adjacent slot portions, extrusion die can be selectively modified to produce extruded articles having a comparatively more complex honeycomb pattern. For example, extruded article 540 of FIG. 13 comprises first openings 542 of a first size (i.e., created by blocking an intersection between two slots and one pin width of the slot on each side of the intersection), and second openings 544 of a second size that is smaller than the first size (e.g., corresponding to the size of square pins of the extrusion die).

An extrusion die can be produced using any combination of die inserts having a plurality of teeth extending from a runner. For example, an extrusion die can be produced using one or more die inserts 100 as shown in FIG. 3, one or more of first and second die inserts 200, 250, or a combination thereof with or without additional die inserts having other dimensions. The die inserts are selected so as to block portions of slots of an extrusion die so as to enable the extrusion die to create honeycomb structures with a desired pattern in which walls of the honeycomb structures have discontinuities (e.g., discontinuous sections 505) corresponding to the locations of the blocked portions of the slots of the extrusion die. The die inserts can be placed and arranged on the extrusion die as necessary to create the desired honeycomb pattern.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A method of manufacturing a honeycomb-structure-forming extrusion die, comprising: inserting a die insert comprising a runner and a plurality of teeth extending from the runner into a slot of an extrusion die such that each of the plurality of teeth blocks at least a portion of the slot, wherein the extrusion die comprises a plurality of pins defined by a first plurality of slots extending in a first direction and a second plurality of slots extending in a second direction disposed at an angle to the first direction; and separating the runner from the plurality of teeth such that the plurality of teeth remain within the slot of the extrusion die, wherein inserting a plurality of teeth of the die insert into a slot of the plurality of slots such that the slit of each of the first plurality of teeth is arranged at an intersection of two slots.

2. The method of claim 1, wherein the plurality of teeth of the die insert are spaced from one another along a longitudinal axis of the runner.

3. The method of claim 1, further comprising:
forming the die insert comprising the runner and the plurality of teeth such that the plurality of teeth are arranged on the runner in a blocking configuration for blocking a plurality of portions of the slot.

4. The method of claim 3, wherein forming the die insert comprises machining a stainless steel sheet.

5. The method of claim 3, wherein forming the die insert comprises photochemical machining of a metal sheet.

6. The method of claim 5, wherein forming the die insert further comprises coating the teeth of the die insert.

7. The method of claim 6, wherein the coating comprises plating.

8. The method of claim 7, wherein the plating comprises nickel plating.

9. The method of claim 6, wherein prior to coating, a thickness of each tooth is less than a width of the slot, and after coating the thickness of each tooth is at least as thick as the width of the slot.

10. The method of claim 3, wherein forming the die insert comprises forming each of the plurality of teeth with a thickness corresponding to a width of a slot of the plurality of slots of the extrusion die.

11. The method of claim 3, wherein each of the plurality of teeth has a first end connected to the runner and a second end, and wherein forming the die insert comprises preparing each of the plurality of teeth such that a thickness of the first end of each of the plurality of teeth is greater than a thickness of the second end of each of the plurality of teeth.

12. The method of claim 1, further comprising inserting a shim into a slot of the plurality of slots prior to inserting the die insert into the slot of the plurality of slots of the extrusion die.

13. The method of claim 12, further comprising inserting the shim into the slot of the plurality of slots of the extrusion die in an orientation perpendicular to the die insert.

14. The method of claim 12, further comprising removing the shim and subsequently securing the plurality of teeth to the extrusion die.

15. The method of claim 1, wherein separating the runner from the plurality of teeth comprises separating the runner by wire electric discharge machining or plunge electric discharge machining.

16. The method of claim 1, further comprising securing the plurality of the teeth to the extrusion die by plating the plurality of teeth and the extrusion die.

17. The method of claim 16, wherein plating is performed using nickel or a nickel alloy.

18. The method of claim 1, further comprising preparing a plurality of die inserts and inserting the plurality of teeth of each of the plurality of die inserts into the plurality of slots of the extrusion die.

19. An extrusion die formed by the method of claim 1.

20. The method of claim 1, wherein the plurality of teeth of the die insert block portions of the slot of the extrusion die such that the extrusion die defines the grid pattern comprises discontinuities.

21. A method of manufacturing a honeycomb-structure-forming extrusion die, comprising: inserting a first die insert into a first slot of a first plurality of slots of the extrusion die, wherein the extrusion die comprises a plurality of pins defining a grid pattern formed by the first plurality of slots that extend in a first direction and a second plurality of slots that extend in a second direction arranged at an angle to the first direction, such that each tooth of a first plurality of teeth of the first die insert blocks a portion of the first slot, the plurality of teeth extending from a first runner of the first die insert; separating the first runner from the plurality of teeth of the first die insert; inserting a second die insert into a second slot of the second plurality of slots such that each tooth of a second plurality of teeth of the second die insert blocks a portion of the second slot, and such that a tooth of the second plurality of teeth of the second die insert mates with a tooth of the first plurality of teeth of the first die insert, the second plurality of teeth extending from a second runner of the second die insert; and separating the second runner from the second plurality of teeth of the second die insert, wherein inserting the first plurality of teeth of the first die insert into a slot of the plurality of slots such that the slit of each of the first plurality of teeth is arranged at an intersection of two slots.

22. The method of claim 21, wherein each of the first plurality of teeth of the first die insert has a first end connected to the first runner and a second end opposite the first end, wherein each of the first plurality of teeth comprises a slit extending from the first end towards the second end; and wherein each of the second plurality of teeth of the second die insert has a first end connected to the second runner and a second end, wherein each of the second plurality of teeth comprises a slit extending from the second end towards the first end, such that the first die insert and the second die insert mate by engaging the slits on the plurality of teeth of the first die insert with the slits of the plurality of teeth of the second die insert.

\* \* \* \* \*